United States Patent [19]
Hanson

[11] Patent Number: 5,652,715
[45] Date of Patent: Jul. 29, 1997

[54] METHODS FOR REDUCING NOISE IN AN ELECTRICAL SIGNAL

[76] Inventor: Thomas A. Hanson, 71 E. 2nd St., Corning, N.Y. 14830

[21] Appl. No.: 483,362

[22] Filed: Jun. 7, 1995

Related U.S. Application Data

[62] Division of Ser. No. 175,632, Dec. 30, 1993, Pat. No. 5,479,251.

[51] Int. Cl.⁶ ............................................. H04B 15/00
[52] U.S. Cl. .......................................... 364/574; 356/73.1
[58] Field of Search .......................... 364/574, 724.01, 364/825; 356/73.1; 359/337, 341, 110, 111; 358/340; 250/227.15; 348/607; 333/166; 386/114

[56] References Cited

U.S. PATENT DOCUMENTS

| | | | |
|---|---|---|---|
| 3,685,610 | 8/1972 | Bschorr | 181/33 L |
| 4,732,469 | 3/1988 | Souma | 356/73.1 |
| 4,952,057 | 8/1990 | Kamikawa et al. | 356/73.1 |
| 5,137,351 | 8/1992 | So | 356/73.1 |
| 5,340,979 | 8/1994 | Baney et al. | 250/214 B |
| 5,365,328 | 11/1994 | Anderson | 356/73.1 |
| 5,450,191 | 9/1995 | Parks et al. | 356/73.1 |
| 5,479,251 | 12/1995 | Hanson | 356/73.1 |
| 5,490,094 | 2/1996 | Heimburger et al. | 364/574 |
| 5,521,851 | 5/1996 | Wei et al. | 364/574 |
| 5,579,248 | 11/1996 | Nieto et al. | 364/574 |

*Primary Examiner*—Emanuel T. Voeltz
*Assistant Examiner*—Tony M. Cole
*Attorney, Agent, or Firm*—William Greener

[57] ABSTRACT

Methods for determining optical properties of an optical waveguide fiber using an optical time domain reflectometer (OTDR) are provided. The methods involve the removal of noise from an OTDR trace (signal) by fitting the noise component of the signal and then subtracting the fitted noise from the original signal to produce a noise-reduced signal. Optical properties are more readily determined from the noise-reduced signal than from the original signal. In particular, the noise-reduced signal can be used to determine axial optical properties of long fibers, e.g., fibers having a length of 50 kilometers or more.

8 Claims, 6 Drawing Sheets

METHODS FOR REDUCING NOISE IN AN ELECTRICAL SIGNAL

This is a divisional of application Ser. No. 08/175,632, filed Dec. 30, 1993, now U.S. Pat. No. 5,479,251, issued on Dec. 26, 1995.

BACKGROUND OF THE INVENTION

1. Field of the Invention

This invention relates to optical waveguide fibers and, in particular, to methods for determining optical properties of such fibers using an optical time domain reflectometer (OTDR). More generally, the invention relates to methods for reducing the noise in an electrical signal, such as the electrical signal produced by an OTDR.

2. Description of the Prior Art

OTDRs operate by sending a short pulse of laser light down an optical waveguide fiber and observing the small fraction of light that is scattered back towards the source. Typical pulsewidths may range from 0.5 meters (5 ns) to 2000 meters (20 μs).

In practice, the fiber under test is connected to the OTDR by a relatively short length of fiber (e.g., a one kilometer length of fiber) known in the art as a "pigtail." The pigtail reduces the deadzone (non-linear region) at the start of the fiber where the OTDR does not provide reliable information. To further improve performance, an index matching oil can be used at the junction between the pigtail and the fiber.

A typical OTDR trace is shown in FIG. 1 where returned power in dBs is plotted along the y-axis and distance down the fiber is plotted along the x-axis. Various features of this trace are identified by the reference numbers 1 through 9, where the number 1 shows the reflection which occurs at the junction between the OTDR and the pigtail, the number 2 shows the trace obtained from the pigtail, the number 3 shows the last point of the pigtail and the first point of fiber under test, the number 4 shows the reflection and associated deadzone produced by the junction between the pigtail and test fiber, the number 5 shows the first point after the near-end deadzone at which trace information can be examined reliably (the "fiber start"), the number 6 shows the fiber trace between the fiber start and the physical end of the fiber (the "fiber end"), the number 7 shows the fiber end, the number 8 shows the reflection which occurs at the fiber end, and the number 9 shows the inherent noise level of the OTDR trace.

OTDRs have been used to determine axial variation of many attributes of optical fibers. The principal attribute is that of attenuation, but others, such as mode field diameter variation can also be measured. As the optical fiber market has expanded, the requirements on axial uniformity have tightened. The fiber lengths that are measured have also increased. This has created a demand for increased resolution at lower returned power levels. There are several hardware approaches to satisfying this demand: increased input power, broader pulses, longer sampling time. Another approach is to provide improved procedures for dealing with the noise contained in an ODTR trace. The present invention is concerned with this latter approach.

SUMMARY OF THE INVENTION

In view of the foregoing, it is an object of the present invention to provide improved methods for distinguishing signal from noise in electrical signals and, in particular, in the electrical signal produced by an OTDR.

To achieve the foregoing and other objects, the invention provides methods for producing noise-reduced electrical signals in which the noise component of the signal is fitted, rather than the signal component. More particularly, the invention fits the noise component on a local basis, rather than over the entire length of the electrical signal. This locally-fitted noise is removed from the overall electrical signal to produce the desired noise-reduced signal. Noise reductions on the order of one hundred to one have been achieved in this way. Significantly, the more noise which is present in the signal, the more noise is removed. Once obtained, the noise-reduced electrical signal can be used for a variety of purposes, including determining a physical property of interest, such as an axial optical property of an optical waveguide fiber in the case of an OTDR signal.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
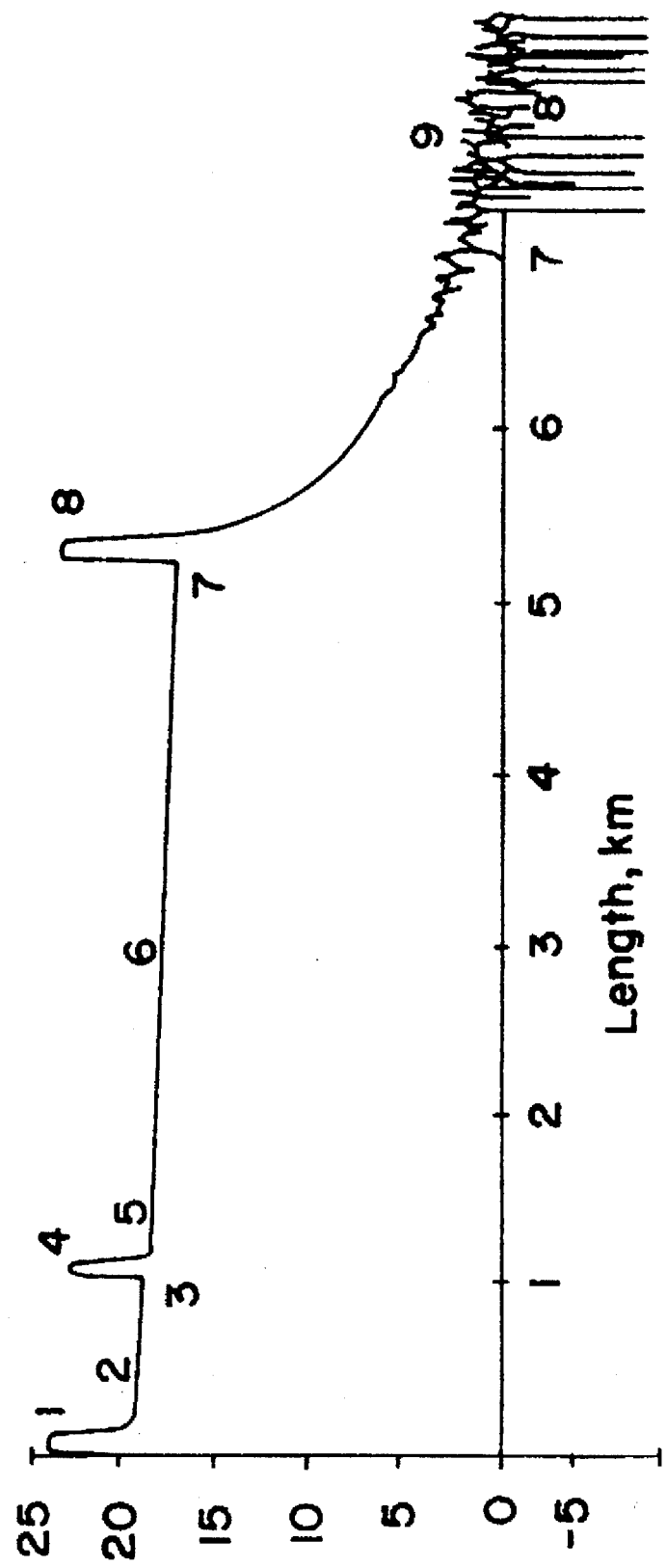
FIG. 1 shows a typical backscatter trace produced by an OTDR.

In overview, a noise-reduced OTDR or other electrical signal is achieved in accordance with the invention by means of the following steps:

(a) providing a function defined over the length of the electrical signal which characterizes the signal's local noise;

(b) locally evaluating said function;

(c) locally determining the signal's noise based on the result of step (b);

(d) locally subtracting the noise determined in step (c) from the electrical signal; and (e) repeating steps (b) through (d) over the length of the electrical signal so as to produce a noise-reduced signal.

In this way, noise reduction is accomplished on a local, rather than a global basis. This local approach is an important aspect of the invention since for a variety of electrical signals, including OTDR signals, it achieves better noise reduction than that achievable by treating the noise as being invariant over the length of the signal.

In general terms, the noise reduction procedures of the invention can be used with any electrical signal wherein one has knowledge about the characteristics of the noise component of the signal. It is particularly useful in cases where one's knowledge of the noise component is greater than one's knowledge of the signal component. Examples of electrical signals, besides OTDR signals, with which the invention can be used include the signals generated by sonar systems, including sonogram systems, radar systems, including weather detection systems, and geologic exploration systems in which seismographic signals are analyzed.

For ease of analysis, the electrical signal will preferably have the property that in the absence of a signal component, the average value of the electrical signal is zero. Electrical signals which do not have this property when originally obtained are preferably modified to have the property before the noise reduction procedure is performed. For example, any carrier signal, which causes the electrical signal to have an average value in the absence of a signal component, is preferably removed before step (a) is performed.

In the case of an OTDR trace, this preferred condition can be readily achieved by performing the noise reduction on the difference between the local slope of the OTDR trace and the average slope of the trace. For an optical waveguide fiber having uniform properties along its length, e.g., a defect-free fiber, this difference has an average value of zero.

For ease of reference, the trace produced by an OTDR will be referred to herein and in the claims as a "set of first values at a set of signal points," the differences between the local slope and the average slope will be referred to as a "set of second values for the set of signal points" (also referred to as the "point slope deviation from average signal" or simply the "point slope signal"), and the values resulting from applying the noise reduction procedures of the invention to the set of second values will be referred to as a "set of third values at the set of signal points."

In the preferred embodiments of the invention, the electrical signal's local noise is characterized in terms of the signal's local signal to noise ratio (or in terms of the nomenclature used above, the ratio of the electrical signal's local "signal component" to its local "noise component"). That is, an estimate is made of the electrical signal's local signal to noise ratio and that estimate is used locally to reduce the electrical signal's noise.

A preferred procedure for obtaining the estimate of the electrical signal's local signal to noise ratio is to fit a continuous function to the electrical signal (or to the modified signal if, for example, an average value modification has been made as described above) and use the difference between that function and the electrical signal, or a function of that difference, as an estimate of the local signal to noise ratio. A particularly preferred function for this fitting is a spline and, in particular, a cubic spline.

As known in the art, a spline is a mathematical function which comprises a set of polynomials. The domain, or x-axis of the signal, is divided into a number of spline intervals, which are typically of equal size. Each spline interval is represented by a distinct polynomial, for example, a quadratic or cubic equation.

At the boundaries between spline intervals, constraints are applied to force the two neighboring equations to be equal in value, first derivative, second derivative, etc., up to one less than the order of the polynomial. For a cubic spline, derivatives up through the second are forced equal at boundaries. For a quadratic spline, only the first derivative is forced equal.

These constraints are preferably effected by the form of the expression that is regressed to find the polynomial coefficients, rather than by explicit least squares equality constraints. The net effect is that the regression matrix is banded and can be solved very efficiently. This banded form is obtained as follows.

Let $b_i$ represent the spline interval boundaries, i=0 to n, for n spline intervals. For a value, x, in the ith spline interval form the variable, u, as:

$$u = (x - b_i)/(b_{i+1} - b_i)$$

In terms of this variable, a cubic spline for all the signal values y in the ith spline interval can be written as follows:

$$y = c_i 0.25(1-u)^3 + c_{i+1}(1 - 0.75u^2(2-u)) + c_{i+2}(1 - 0.75(1-u)^2(1+u)) + c_{i+3} 0.25 u^3$$

The values, $c_i$, i=0 to n+2, are the unknown regression coefficients. An efficient procedure for solving for these coefficients can be found in C. L. Lawson & R. J. Hanson, *Solving Least Squares Problems*, Prentiss-Hall, Inc., Englewood Cliffs, N.J., 1974, at pages 301–302. In accordance with this procedure, the signal values for each spline interval are sequentially collected and processed to reduce the problem to an upper banded form. This reduces the amount of storage to a matrix that for a cubic spline, has five columns and $m_s + (n+3)$ rows, where $m_s$ is the number of signal points in the maximum spline interval. After the signal values have been processed in this way, the solution for the $c_i$ is readily extracted from the upper banded matrix.

An orthonormal column basis for a cubic spline fit can be obtained by means of a singular value decomposition. This basis gives an indication of what variation the spline can support since all spline predictions are a linear combination of these columns.

Fourier transforms of the columns show that as the column number increases, the dominant Fourier frequency increases. The spline can thus be viewed as an interactive low pass filter. The bandwidth, or 3 dB rolloff frequency, is one way to assess the spline as a filter. The period of the 3 dB frequency is about twice the spline interval size. Accordingly, if one wants to represent a signal composed of sinusoids with a period at or around one kilometer, one should use a spline interval size that is less than about 0.5 km.

For many applications, the noise-reduced signal produced by the above procedures is used directly to, for example, control a process or determine a physical property of a product. In some cases, however, it may be desirable to condense the noise-reduced signal for purposes of analysis and/or storage for later use. In such cases, a continuous curve can be fitted to the noise-reduced signal. A particularly preferred curve for these purposes is a cubic spline of the type described above. Among other things, fitting with such a curve can achieve a significant reduction in the amount of space needed to store the noise-reduced signal on, for example, a magnetic medium. In addition, the fitting further smooths the signal, which, in general, makes the signal easier to analyze.

In connection with such fitting, it should be noted that one of the drawbacks of a spline fit is that the ends of the fit are often highly variable. Inspection of the orthonormal column basis discussed above shows why. Most of the columns end in forms that approach zero. Accordingly, if the signal to which the spline fit is applied has a value near zero at its ends, an improved spline fit can be achieved. For OTDR signals, the "excess backscatter" and "excess loss/ attenuation" signals discussed below have this property, and thus fitting a spline to either or both of these signals for the purpose of analysis or condensed storage is, in general, preferred.

The noise reduction procedure of the invention is preferably performed on a digitized form of the electrical signal using a digital computer, although hard-wired approaches can be used, if desired. The procedure can be viewed as a filtering of the electrical signal with a locally-varying filter and/or as performing a locally-varying matrix operation on the electrical signal in digital form.

The derivation of appropriate filters/matrices for the case of an electrical signal whose noise component comprises autocorrelated Gaussian noise is presented below. These filters/matrices can be used to produce noise-reduced signals from, for example, OTDR point slope signal, which signals, in turn, can be used to determine a variety of optical properties of an optical waveguide fiber, including, without limitation, attenuation non-uniformity (see TIA-FOTP 108), backscatter non-uniformity (see TIA-FOTP 61), and the location of point defects and reflections (see TIA-FOTP 59).

For example, reflections can be located through the use of wavelets. A wavelet is a mathematical form that has an average equal to zero and that can vary in both frequency and phase. The phase varying component allows the form to appear in any part of the signal. The frequency varying component allows the form to vary in the extent to which it covers the abscissa of the signal.

To find a reflection, the wavelet is correlated iteratively with the signal at each of a prefixed set of phase and frequency values. The phase and frequency values at which the correlation is both maximum and in excess of some threshold value are designated as reflection sites. The correlation value can be interpreted as a magnitude value for the waveform in the signal.

The waveform used is based on the following equation for a reflection, as an addition to the original trace:

$$f(x) = m \exp[-((x-x_0)/\sigma)^4/4]$$

where: m is magnitude; $\sigma$ is width, a frequency parameter; and $x_0$ is the center of the reflection site, a phase parameter.

When this form is applied to the OTDR point slope signal, the first derivative of f(x) is the appropriate model, i.e.:

$$f'(x) = (m/\sigma)((x-x_0)/\sigma)^3 \exp[-((x-x_0)/\sigma)^4/4]$$

This equation goes to zero quickly as x deviates from $x_0$ and can be represented in a finite array. As long as an equal number of points above and below $x_0$ are included in the array, the total of the values is zero, one of the wavelet requirements.

The choices for the phase values are all possible discrete positions over which the entire model can be applied. The choice of frequency, or $\sigma$ values, is determined by the OTDR laser pulse width, expressed as the FWHM width in number of positions (signal points). If PW is the pulse width, then the median value of $\sigma$, i.e., $\sigma_0$, is given by:

$$\sigma_0 = (PW/2)/3^{1/4}$$

Other $\sigma$ values ranging around $\sigma_0$ by, for example, 0.8 $\sigma_0$ to 1.2 $\sigma_0$ in increments of 0.05 $\sigma_0$ can be included in the frequency search. The total width of any array, one for each value of $\sigma$, in this case need only be about 3 PW. Each such array can be pre-normalized so the sum of squares of the array is equal to one. This makes the correlation computation more efficient.

For each phase position, all frequency possibilities are computed and the maximum correlation frequency and magnitude are retained. This correlation can be evaluated with a t-statistic relating to the significance of the magnitude with respect to the residual noise in the noise-reduced signal, e.g., the difference between the noise-reduced signal and a cubic spline fit to the noise-reduced signal. If the t-statistic exceeds a given threshold, a value of four, for example, the position is designated as having a reflection.

Noise Reduction

In general terms, the locally-varying filters/matrices employed in the noise reduction procedure are derived using the principle components approach to multivariate analysis. Preferably, the principle components are obtained by singular value decomposition (SVD) of the involved matrices. Procedures for performing SVD can be found in, for example, the Lawson and Hanson text referred to above. The application of these procedures to develop filters/matrices suitable for use with autocorrelated Gaussian noise is described below. Appropriate filters/matrices for other types of noise can be obtained by applying the principle components/SVD approach to a matrix A (see below) appropriate to the noise of interest.

In overview, the matrix A is constructed considering an electrical signal consisting of invariant noise. The signal is considered to be composed of m segments with each segment containing n signal points. For ease of treatment, the noise is assumed to be of unit magnitude. Variation in the magnitude of the noise is provided by the constant of proportionality "v" discussed below. These mn signal points can be thought of as being arranged in a matrix having m rows and n columns. This matrix constitutes the matrix A. In accordance with the invention, this matrix is treated as follows.

Linear theory says that given any matrix A, three unique matrices, U, S, and V, can be determined so that:

$$A = U S V' \tag{1}$$

where

V' is the transpose of V $$U'U = I (U \text{ is orthonormal}) \tag{1a}$$

$$V'V = I (V \text{ is orthonormal}) \tag{1b}$$

S is diagonal, with diagonal element values sorted in decreasing order. (1c)

Since A is m rows by n columns, U is m by n, U'U is n by n, and both S and V are n by n.

The columns of V are the eigenvectors; the diagonal elements of S are the eigenvalues; and the columns of U are the orthonormal column basis.

If one takes the transpose of A, i.e., A', the rows of A become the columns of A', which by equation (1) are given by:

$$V S U' = A' \tag{2}$$

Also, by combining S and U', a matrix C can be defined as follows:

$$S U' = C \tag{2a}$$

From equation (2), the columns of C correspond to the columns of A' as follows:

$$V C = A' \tag{2b}$$

If one thinks of each column of A' as being a regression problem, with columns of V forming the independent variables and the associated column of C as being regression coefficients, one can see that each set of n signal points, i.e., each column of A', can be represented as a set of n magnitude coefficients. The matrix V is fixed for all signal segments. The first magnitude coefficient times the first column of V plus the second magnitude coefficient times the second column of V plus . . . yields the original signal segment.

The columns of V correspond to forms of behavior and the associated magnitude coefficient for a given signal segment indicates the extent and sign of that behavior present in the segment.

Since C contains all the information about variation from one signal segment to another, its characteristics are further examined. In particular, consider the covariance matrix for the transpose of C:

$$cov(C')=C\ C'/m=S\ U'\ U\ S'/m=S\ S'/m \quad (3)$$

Since S is diagonal, the n magnitude coefficients are not correlated to one another across signal segments. In addition, the variance of the jth magnitude coefficient is proportional to the square of the jth eigenvalue.

Let $\lambda_j$ be the jth eigenvalue. If $c_{ji}$ is the jth coefficient on the ith signal segment, and $c_j$ is the set of all the jth coefficients across i, a relationship between the n magnitude coefficients, in terms of variance, emerges:

$$Var(c_j)=v\ \lambda_j^2, \quad (4)$$

where v is a constant of proportionality. This constant allows the system to include noise having a variance different from unity. For unity noise, v would simply be 1/m. By letting v take on other values, variances different from unity are included in the analysis.

If on a given signal segment, for example, the last eigenvalue was 0.01 times the first eigenvalue but the last magnitude coefficient was 100 times the first, one would say that signal segment was not expected, or normal.

It is this observation which forms the basis for the fitting of the error component of the electrical signal in accordance with the invention. A given segment of n signal points can be viewed as a vector in n-space. The behavior of vectors derived from random processes, i.e., the behavior which represents noise, are contained in an envelope of that space. Portions of the overall signal that fall outside that space are then the signal component. It is in this sense that the noise component of the overall electrical signal is fitted in accordance with the invention.

To fit the noise requires only the eigenvector matrix V and the eigenvalues of S. To get these, the rows of A, corresponding to the signal segments, are filled out with n sequential observations from a random distribution. Any random distribution that can be simulated can be used. As discussed below, analytic procedures, rather than simulation, can be used for some random distributions.

For an OTDR trace, the errors on the trace (i.e., the set of first values) can be assumed to be Gaussian and independent. The errors for the local slope deviation from average (i.e., the set of second values) are then autocorrelated. One reason for using the local slope deviation from average is that if there were no true slope deviations from average, the average of a given segment is expected to be zero.

Using Monte Carlo techniques, approximately 10,000 simulated segments of error were used to fill out matrix A. For the purpose of these computations, a segment was assumed to contain 73 signal points, i.e., n was assumed to be 73.

Singular value decomposition of this 10,000×73 matrix was performed to determine the eigenvalues and eigenvectors for the simulated noise. The matrix was solved computationally by sequential Householder transformations that, for each new batch of several rows, reduces the problem to Upper Hessenberg form. This reduced the amount of required computer storage enormously, enabling the problem to be solved using a personal computer. Householder transformations and the upper Hessenberg form are discussed in the Lawson and Hanson text referred to above (see, in particular, pages 53–58, 236, and 308).

As known in the art, a Householder transformation is an orthogonal transformation which when applied to a matrix produces all zeros in a specified range of rows for a specified column. By repetitive use of this transformation, any matrix can be transformed into upper Hessenberg form.

Sequential Householder transformations involve performing repetitive Householder transformations on only a portion of matrix A at a time in order to reduce the amount of computer storage required. Repetitive Householder transformations are performed on each portion until the portion is in upper Hessenberg form. For example, instead of performing the Householder transformation on the entire 10,000 row×73 column matrix, the transformation can be sequentially applied on much smaller matrices, e.g., matrices of 100 or less rows by 73 columns, where each of the smaller matrices is constructed by appending additional rows onto a prior portion after transformation of that prior portion into upper Hessenberg form.

The upper Hessenberg form of matrix A obtained in this manner is then transformed into upper bi-diagonal form by means of a row/column Householder sweep, that is, a repetitive application of the Householder transformation to zero out specified ranges of rows for given columns and specified ranges of columns for given rows (see the Lawson and Hanson text at pages 295–297).

The final step in the singular value decomposition of matrix A involves applying a "QRBD" procedure to the upper bi-diagonal matrix resulting from the Householder sweep. This procedure can be found in, among other places, the Lawson and Hanson text at pages 298–300. The procedure involves a series of Givens transformations which results in a matrix whose diagonal elements contain the square root of the eigenvalues of A (see the Lawson and Hanson text at page 309). Through the simultaneous performance of the above transformations on an identity matrix, the eigenvectors of A are also obtained.

As discussed above, rather than using a simulation procedure, the eigenvalues and eigenvectors characteristic of the noise component of the electrical signal can also be obtained analytically for certain types of noise. This approach uses a matrix proportional to the covariance matrix, i.e., A'A, rather than A.

For example, in the case of errors which are Gaussian independent, A'A/m is simply a diagonal matrix with elements equal to the variance. For first order autocorrelated errors, i.e., errors of the type discussed above in connection with the Monte Carlo simulation approach, A'A/m has diagonal elements equal to 2 and super and sub diagonal elements equal to −1. Using the Householder sweep procedure, this matrix can be made upper bi-diagonal and then solved for the desired eigenvalues and eigenvectors using the QRBD procedure. Since A'A=VSSV', the eigenvalues of A'A are the squares of the eigenvalues of A and the eigenvectors are the same.

Once the eigenvalues and eigenvectors have been obtained, there is still the problem of how to use them to remove the noise component from the electrical signal. Given n points in a segment of the electrical signal, there are n eigenvectors that when used in a regression, can fit the signal exactly. To include the coefficient variance information in the problem, the regression matrix is augmented with an identity matrix that controls the variance. The problem is set up as:

$$\left|\begin{array}{c} V \\ I \end{array}\right| c = \left|\begin{array}{c} y \\ 0 \end{array}\right| + \left|\begin{array}{c} -s \\ c \end{array}\right| \quad (5)$$

where

V is the eigenvector matrix,

I is an identity matrix, c are the unknown regression coefficients, y is an array of signal values, 0 is an array of zeros, and s is an array of inferred signal component values.

Linear regression would ordinarily solve this by minimizing the sum of squares of the elements of the two arrays, s and c, which, appearing on the far right, are considered "error" terms. With weighted least squares, each row is divided by the square root of the expected variance of the associated error term. The variance of the jth coefficient is given as:

$$\mathrm{Var}(c_j) = v\, \lambda_j^2, \quad (6a)$$

where v is an unknown constant of proportionality.

Let T be the total sum of squares of the signal:

$$T = \Sigma\, y_j^2 \quad (6b)$$

Since the columns of V are orthonormal, the total variance of the signal is the sum of the squares of the coefficients plus the sum of squares of the elements the signal component, i.e., s. The expected sum of squares of the coefficients is the sum of the variance terms. Assuming that the variance of the signal component elements is equal across position, then:

$$v\, \Sigma\, \lambda_j^2 + n\, \mathrm{Var}(s) = T \quad (6c)$$

where s is any element of the signal component.

Let R be an estimate of the signal to noise ratio (or, in terms of the nomenclature used above, the ratio of the signal component to the noise component):

$$1 + \quad (6d)$$

$$n\mathrm{Var}(s)/(v\Sigma\lambda_j^2) = T/(v\Sigma\lambda_j^2) \Rightarrow 1 + R = T/(v\Sigma\lambda_j^2) \Rightarrow v = T/(\Sigma\lambda_j^2(1+R))$$

The expected variance of the jth coefficient, $c_j$, is given by the following, and one would then divide each row of the identity portion of equation (5) by the square root of:

$$\mathrm{Var}(c_j) = T\, \lambda_j^2 / (\Sigma\, \lambda_j^2\, (1+R)) \quad (7a)$$

The expected variance of a signal component value is given by the following, and the rows of the eigenvector portion of equation (5) are divided by the square root of:

$$\mathrm{Var}(s) = T\, R/(n(1+R)) \quad (7b)$$

Since the square root of the value found with (7b) is constant across the first n rows of equation (5), one can multiply the entire matrix by this to get the following weighted regression problem:

$$\left|\begin{array}{c} V \\ W \end{array}\right| c = \left|\begin{array}{c} y \\ 0 \end{array}\right| + \left|\begin{array}{c} -s \\ Wc \end{array}\right| \quad (8)$$

where W is a diagonal matrix with the jth element, $w_j$, given by:

$$w_j = [\Sigma\, \lambda_j^2\, R/(n\, \lambda_j^2)]^{1/2} \quad (8b)$$

The least squares solution of the problem given by equation (8) is done by minimizing the sum of squares of the elements of s and the sum of squares of Wc. This minimization will produce estimates of the coefficients that balance the variances according to the principal component model. The least squares Solution for c is:

$$c = \left[\left|\begin{array}{c} V \\ W \end{array}\right|'\left|\begin{array}{c} V \\ W \end{array}\right|\right]^{-1} \left|\begin{array}{c} V \\ W \end{array}\right|' \left|\begin{array}{c} y \\ 0 \end{array}\right| \quad (9)$$

$$= [I + W'W]^+ V'y$$

where the "+" notation is used for the inverse of a diagonal matrix, each diagonal element of which is the inverse of the original value.

W'W is a diagonal matrix with the jth element equal to $w_j^2$, with $w_j$ given by equation (8b).

The inferred signal component array, s, is given as the difference between the overall signal and the computed error:

$$s = y - Vc = (I - V(I + W'W)^+ V')\, y \quad (10)$$

$$s = Fy \quad (10a)$$

The problem has been reduced to one unknown parameter, R, the signal to noise ratio. The problem is, in essence, a Bayesian approach. At the same time, the expression in equation (10) is similar to a ridge regression.

As discussed above, a preferred procedure for obtaining an estimate for the local value of R is to fit a continuous curve, preferably a cubic spline, to the overall signal (or the modified overall signal), and then use a function of the difference between the local values of the continuous curve and the overall signal (or modified overall signal) as an estimate of the local signal to noise ratio. In particular, a preferred function for this purpose is as follows, where $R_k$ is the signal to noise ratio for the kth signal point, $z_i$ is the value of the continuous curve at signal point i, $y_i$ is the value of the overall signal (or modified overall signal) at signal point i, l and q are the segment boundaries for the segment with which the kth signal point is associated (i.e., the series of n signal points with which the kth signal point is associated; see above), where l is less than or equal to k and q is greater than or equal to k, and p has a value between 1 and 2:

$$R_k = \left( \frac{\sum_{i=l}^{q} z_i^2}{\sum_{i=l}^{q} (y_i - z_i)^2} \right)^{1/p} \quad (11)$$

For OTDR traces, a value of p equal to 1 has been found to somewhat underpredict the locations of point defects in optical waveguide fibers, and a value of p equal to 2 can leave some excess noise in the noise-reduced signal. Accordingly, a value of p around 1.5 is preferred, although any value in the 1 to 2 range can be used if desired. When a cubic spline with a spline interval of about 0.35 kilometers (43 signal points) is used as the continuous curve, a signal segment of 73 signal points corresponding to approximately 0.60 kilometers of fiber has been found to work successfully for traces having a sigma of noise up to about 0.25 dB. For higher noises, longer signal segments, e.g., 129 signal points, can work somewhat better in some cases.

The computations called for by equation (10a) can be reduced through the observation that the center row of F predicts the center signal component value. Obtaining this value requires only a single vector multiplication, i.e., multiplying the center row by y. Moreover, by advancing the contents of y by one signal point, e.g., by one unit of time/length for an OTDR trace, reapplication of the center row will yield an estimate of the next signal value. If the signal to noise ratio were constant over the length of the electrical signal, the center row would be constant and would thus serve as a fixed filter for removing the noise from the signal.

As discussed above, the signal to noise ratio is not, in general, constant over the length of the signal. Nevertheless, advantage can still be taken of the reduced computation provided by the above observation, if the contents of the middle row of F are calculated in advance for a range of signal to noise ratio values. Indeed, it has been found that plots of the elements of the middle row versus log(R) are quite smooth and that such plots can be accurately represented by cubic splines, e.g., cubic splines having 18 spline intervals. Accordingly, computational efficiency can be achieved by storing the spline coefficients in a look-up table and using those stored values to calculate appropriate elements for the middle row of F based on the local value of the signal to noise ratio. It should be noted that this middle row procedure cannot be used for the segments at the two ends of the signal. For these segments, the full matrix multiplication of equation (10a) is used.

Without intending to limit it in any manner, the present invention will be more fully described by the following example in which noise is removed from an OTDR trace for a 50 km optical waveguide fiber. The terminology and general procedures used in this example are as follows.

Terminology/General Procedures

Backscatter trace (FIG. 2): A plot of the log of backscatter power as measured by an OTDR from a single end of an optical waveguide fiber. This is the usual plot one observes.

Figure 2A:
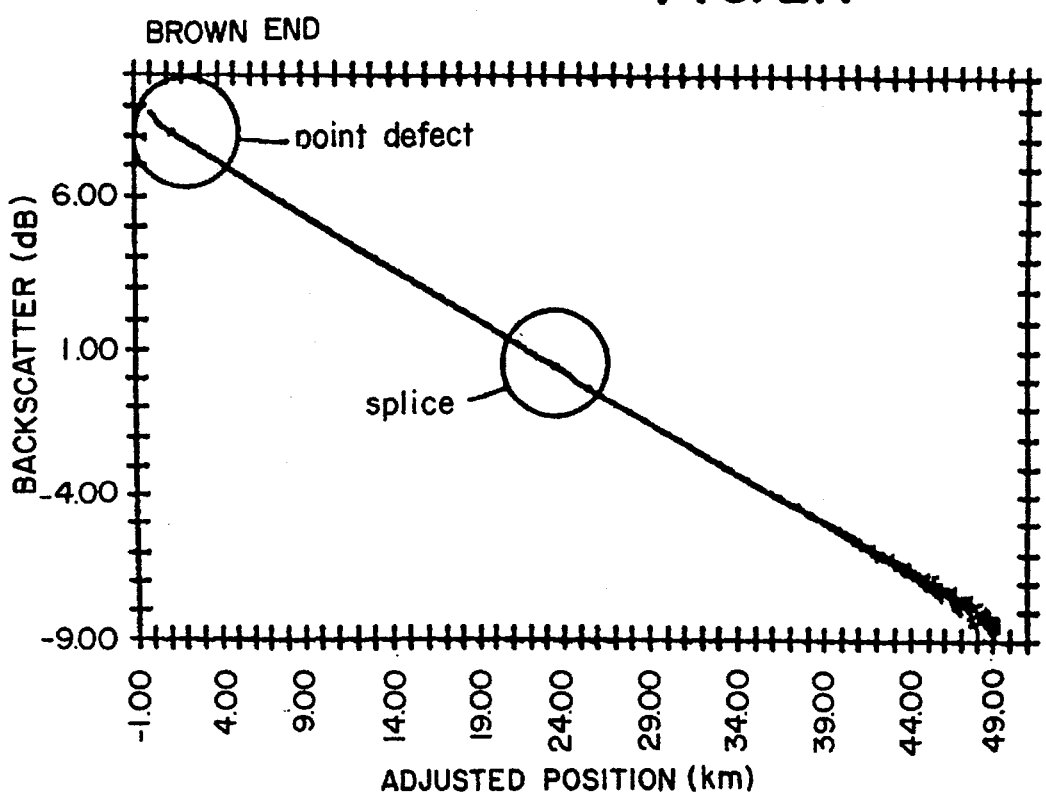
FIG. 2 shows backscatter traces taken from the brown end (upper panel) and green end (lower panel) of a 50 kilometer optical waveguide fiber.
Figure 2B:
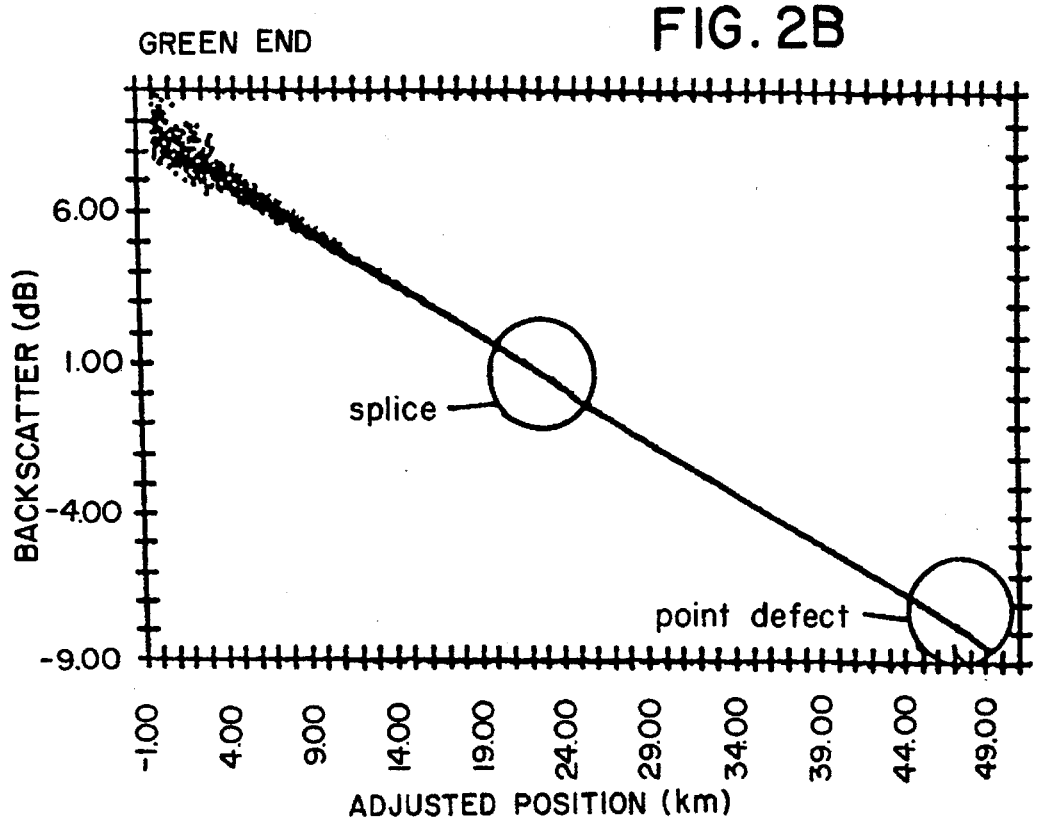
Figure 3A:
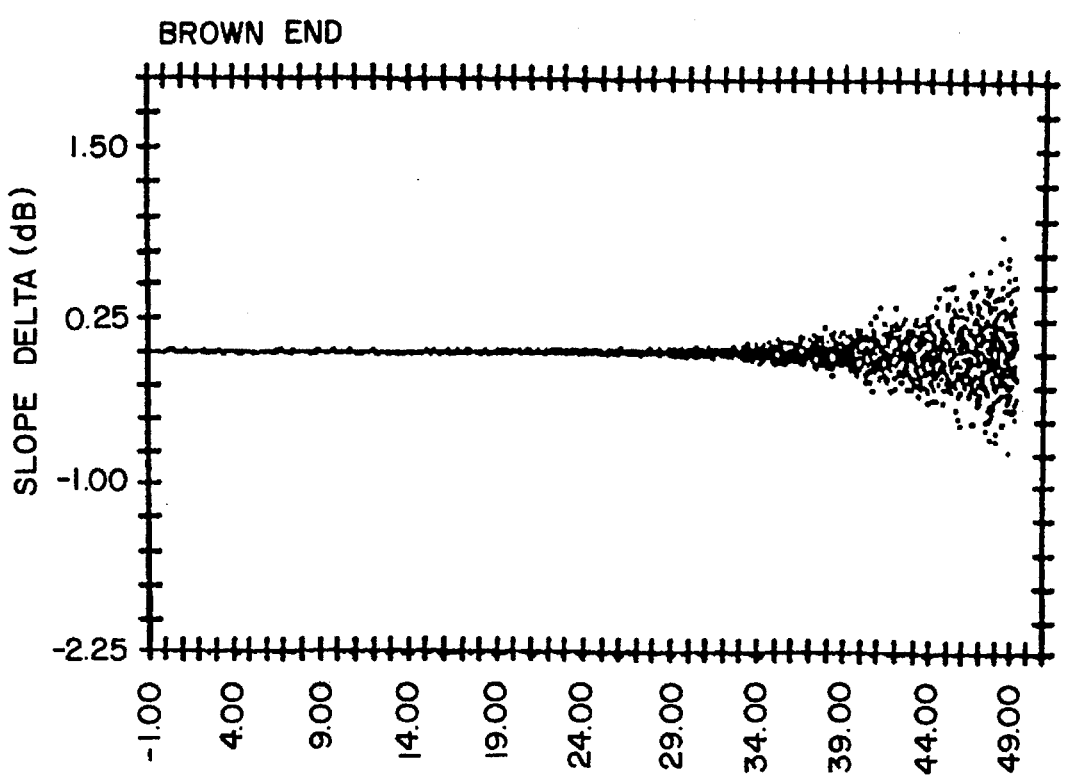
FIG. 3 shows the deviations of the point backscatter slope from average for the brown end (upper panel) and green end (lower panel) traces of FIG. 2. The average slope was 0.3444 dB/km over both the brown and green traces.
Figure 3B:
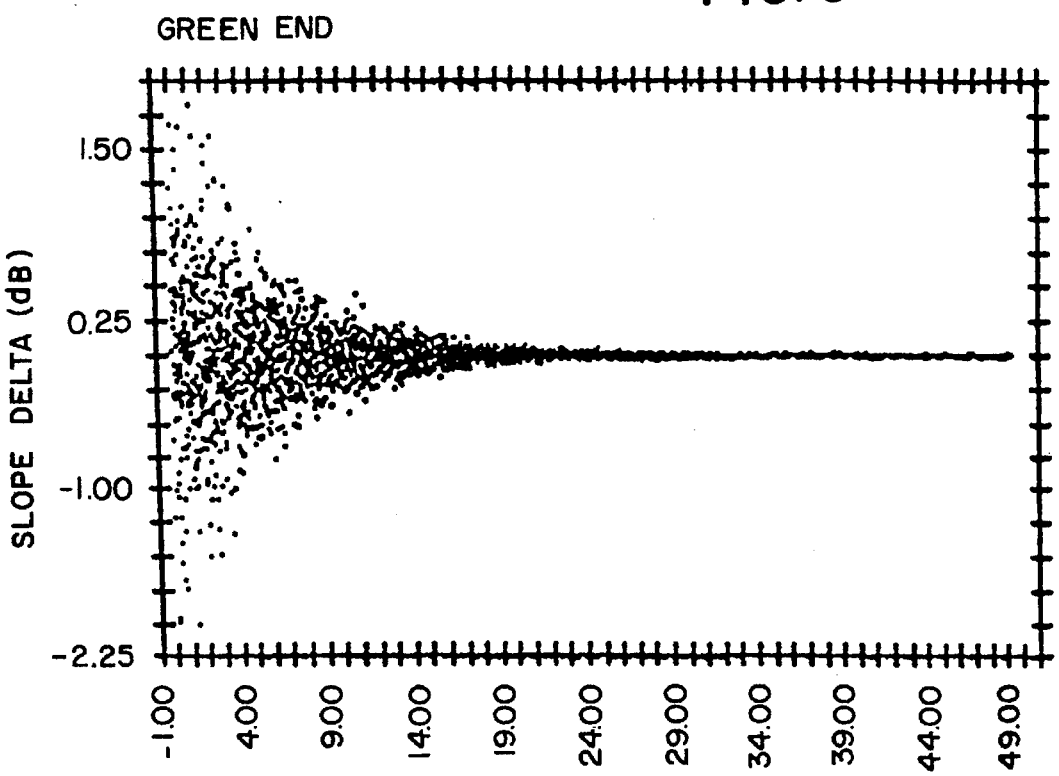

Brown end/Green end: The particular end from which a unidirectional OTDR measurement was made. The brown end/green end plots of FIGS. 2 and 3 are oriented with the brown end closer to the OTDR instrument.

Bi-directional inversion: The view, as measured from the green end, is inverted in both position and in value to be in alignment with the view from the brown end. The inversion in position requires an identification of the start and end of the actual fiber, the removing of pigtail and end reflections, and the adding of an offset value to the green end view.

End identification and bi-directional synchronization: End identification was done by manually reviewing the reflections at the pigtail splice and the end of the fiber. The 50 km fiber used in this example was prepared by splicing together two 25 km fibers. Bi-directional synchronization was done using the reflection which occurs at the splice.

End-to-end attenuation coefficient (alpha-e): The total loss across both the green end and brown end measurements, divided by 2 times the length, i.e., the average of the green and brown attenuation coefficients.

Point backscatter slope: If the backscatter trace values are labeled $y_i$, with i increasing with position, the point slope between positions i and i+1 is $y_i - y_{i+1}$. It is the difference, in dB, between adjacent trace locations.

Average backscatter slope: The average of the point backscatter slope, including both green and brown measurements. This is related to alpha-e by the length increment between positions.

Deviation of the point backscatter slope from average (FIG. 3): This is what non-uniformity is. Actual deviations, as opposed to deviations resulting from noise, constitute the "signal component" which is being sought. In this example, the noise reduction procedures of the invention are applied to this form of the OTDR signal.

Noise or error: High frequency oscillations in the point backscatter slope. In the error fitting filter, noise is assumed to be Gaussian and independent from point to point on the backscatter traces. As discussed above, this means that noise is autocorrelated on the point slope plot.

Excess Backscatter: The cumulative sum of the deviation of the point backscatter slope from average. The x-axis is position (km), and the y-axis is cumulative excess (dB). The difference between y-axis values associated with two positions is the difference between the actual change in backscatter that occurs between the locations and the amount of backscatter change that would be implied by the end-to-end attenuation coefficient. The excess backscatter curves for the brown and green ends of the 50 km fiber were computed, but are not shown in the figures.

Excess Loss/Attenuation (FIG. 4; top panel): The average of the two excess backscatter curves for the brown and green ends. Differences between the y-axis values of two positions yield the difference between the actual attenuation that occurs over the length of the fiber between the positions and the attenuation that is implied by the end-to-end attenuation coefficient. When this value is divided by the length of fiber between the positions, it yields a delta attenuation coefficient value.

MFD variance plot (FIG. 4; bottom panel): This plot shows the computed deviation (dB) of mode field diameter, from the initial position, as a function of position. It is computed as the difference in the two excess backscatter curves, divided by two. The plot is scaled in dB rather than micrometers so differences between other locations can be more easily evaluated. If $\Delta$ is the difference in the y-axis values of two locations, then the ratio of mode field values, r, for the two positions is given by:

$$r = 10^{**}(\Delta/10) \text{ (according to Marcuse)}$$

Figure 4A:
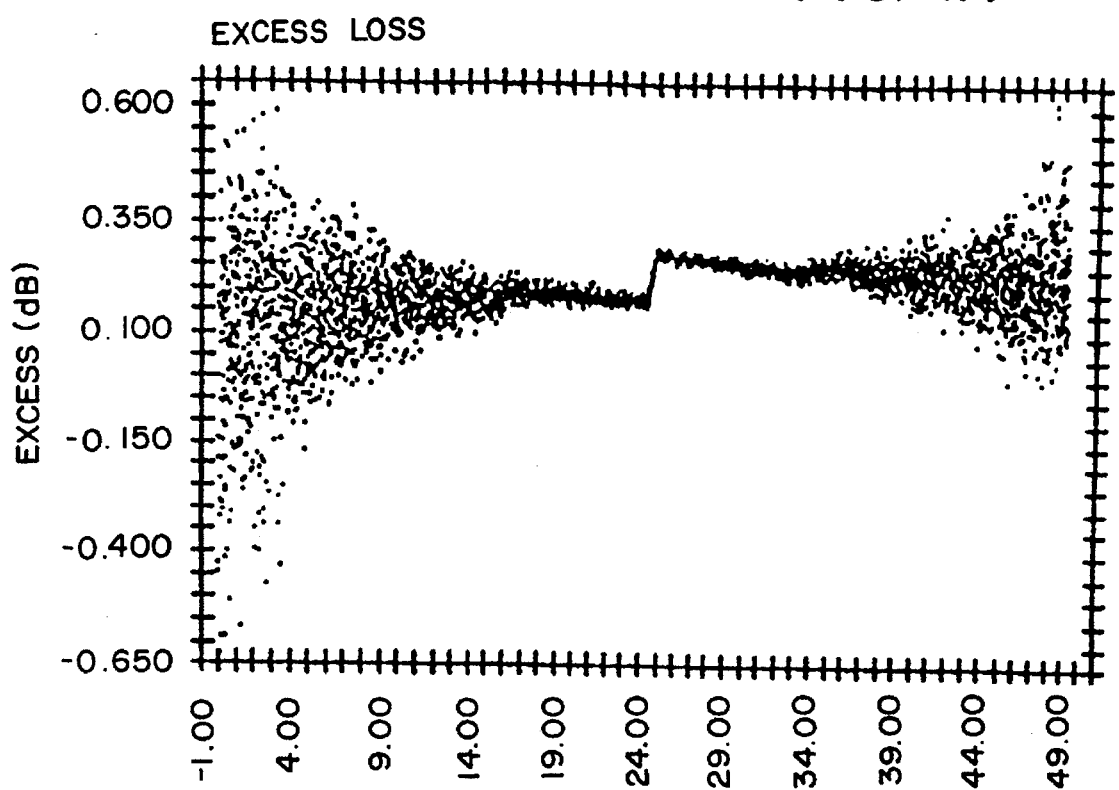
FIG. 4 shows an excess loss/attenuation plot (top panel) and a MFD variance plot (bottom panel), each of which was obtained from green and brown end excess backscatter curves (not shown) computed from the signal of FIG. 3.
Figure 4B:
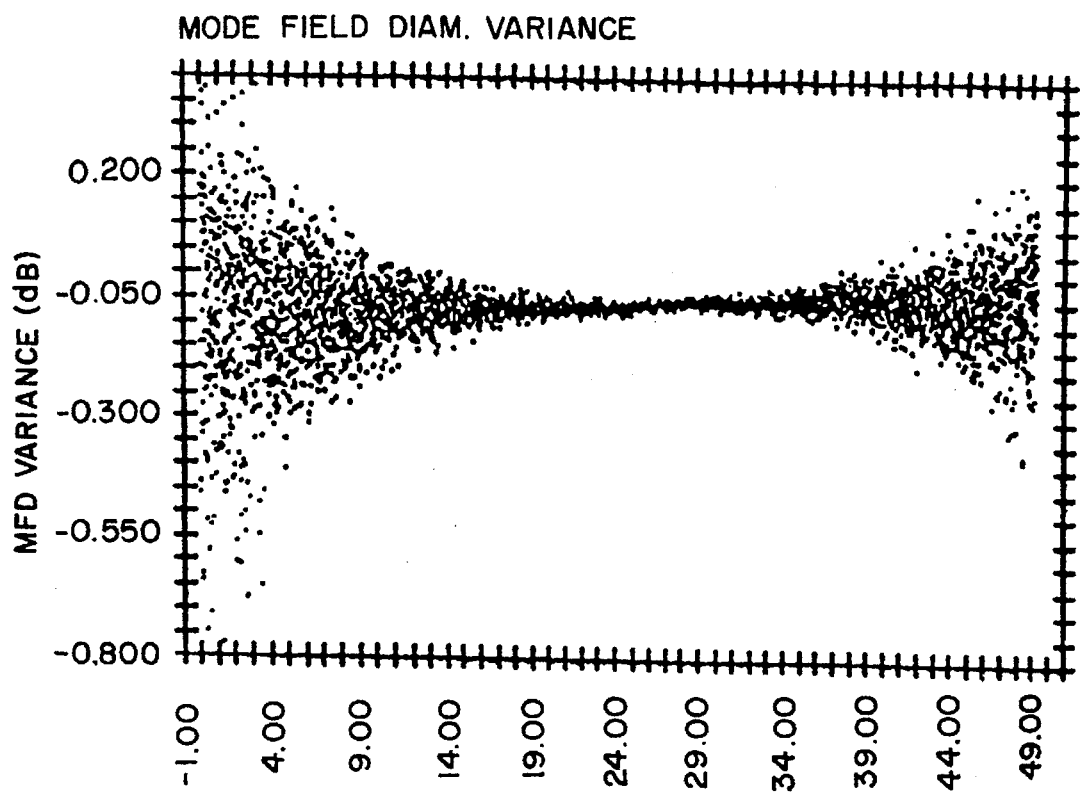

Raw Signal: Signal without filtering. FIGS. 2–4 show raw signal.

Figure 5A:
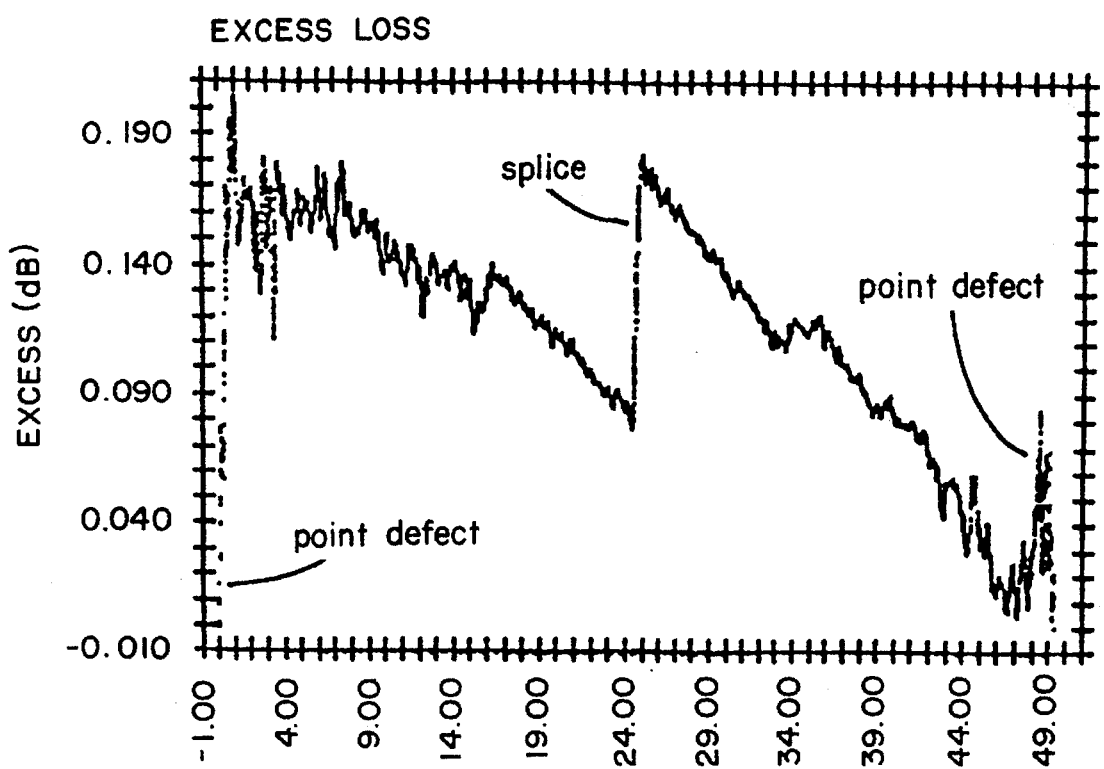
FIG. 5 shows versions of the plots of FIG. 4 obtained from noise-reduced versions of the plots of FIG. 3.
Figure 5B:
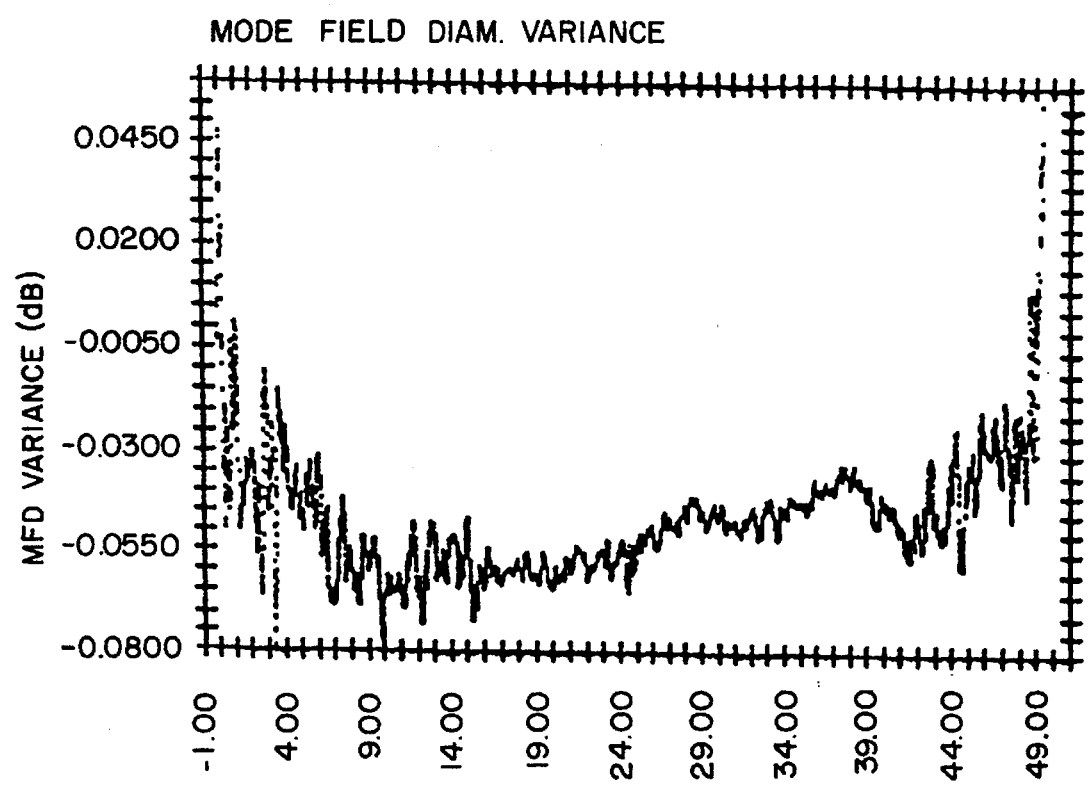

Filtered Signal: The result of applying the error reduction procedure of the invention in which the error is fitted and that which is not error is considered to be signal. FIG. 5 shows versions of FIG. 4 obtained from filtered versions of the signals of FIG. 3.

Figure 6A:
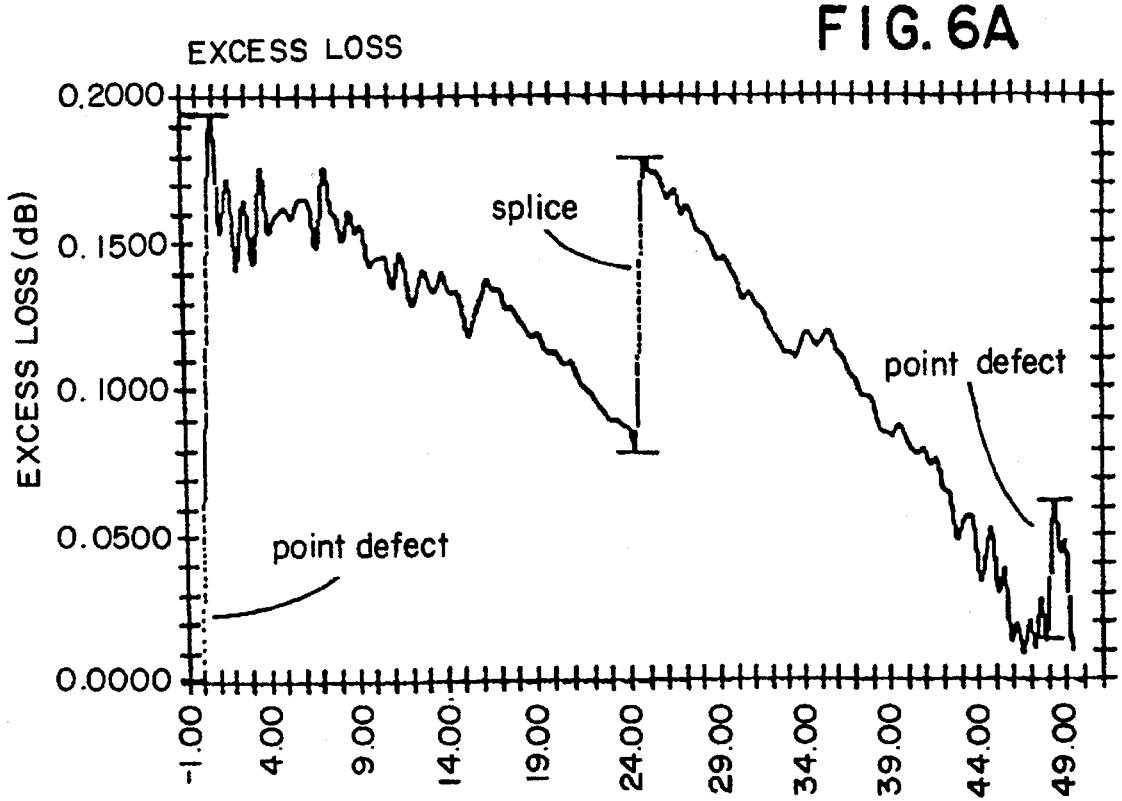
FIG. 6 shows the results of smoothing the plots of FIG. 5 with cubic splines.
Figure 6B:
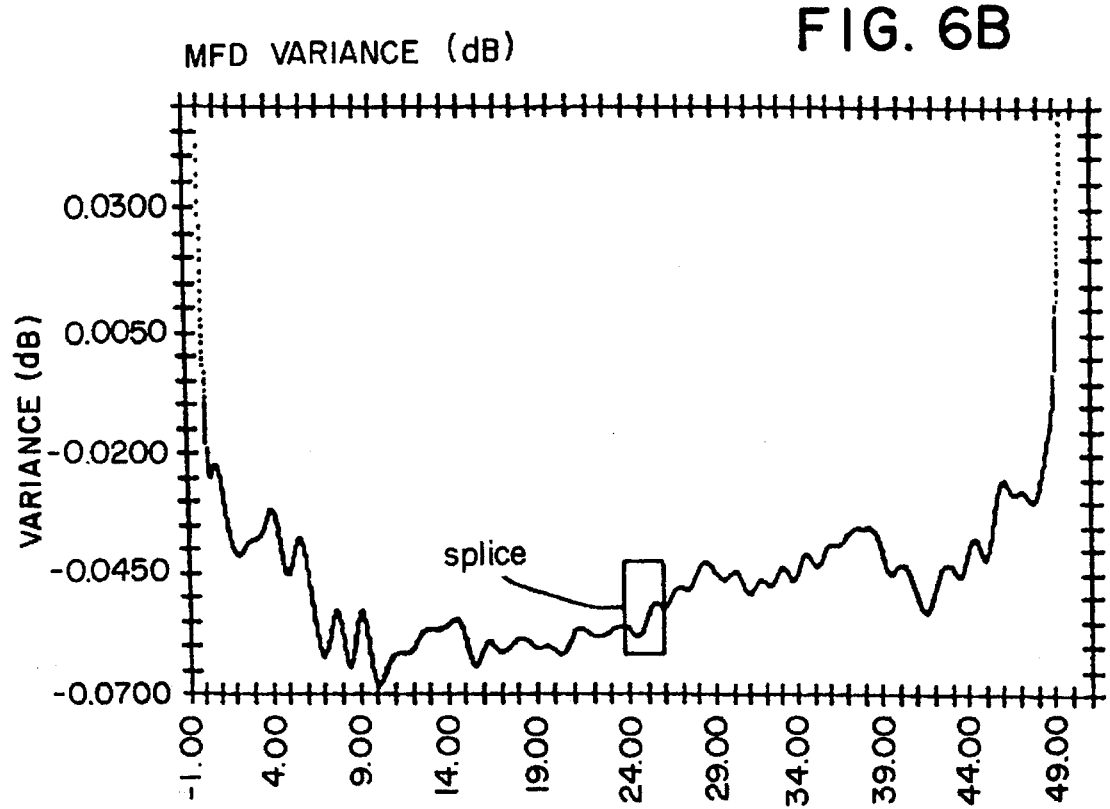

Smoothed Filtered Signal: Applying a cubic equation to a filtered signal. FIG. 6 shows smoothed filtered signals obtained by fitting the signals of FIG. 5 with cubic splines.

EXAMPLE

Bi-directional OTDR traces were obtained from a 50 km optical waveguide fiber at a wavelength of 1310 nanometers using a pulsewidth of 408 meters. At this wavelength, about a 20 dB loss occurred over the entire 50 km length. The spacing between the signal values generated by the OTDR was approximately 0.008 kilometers. As discussed above, the 50 km fiber consisted of two 25 km fibers spliced together.

The raw OTDR signal obtained from these measurements is shown in FIG. 2, where the location of the splice and of known point defects in the 25 km sections are shown. The deviation of the point backscatter slope from average is shown in FIG. 3. The noise in this signal is evident, i.e., it is about ±1.0 dB. The results of using the signal values of FIG. 3 to prepare an excess loss/attenuation plot and a MFD variance plot are shown in FIG. 4. Again, the noise is evident. Indeed, the noise levels of the plots of FIGS. 3 and 4 are so high as to make the plots unusable since only the splice shows up.

The noise-reduction procedures of the invention were applied to the signals of FIG. 3 using a segment length of about 0.6 kilometers, i.e., 73 signal points per segment, a spline interval of about 0.35 kilometers for the cubic spline fit to the point slope signal, i.e., 43 signal points per interval, and a p value in equation (11) of 1.5. The noise reduced signals were then used to prepare the excess loss/attenuation plot and the MFD variance plot of FIG. 5. A comparison of these plots with the corresponding plots of FIG. 4 show the substantial improvement in noise achieved by the invention, i.e., on the order of a 100 fold reduction in noise. Except in the regions of the ends of the MFD variance plot, the plots of FIG. 5 can be effectively used in determining the axial properties of an optical waveguide fiber.

The post filtering spline fitting procedures of the invention were applied to the plots of FIG. 5, and the results are shown in FIG. 6. Cubic splines were used with a spline interval size of about 0.35 kilometers, i.e., 43 signal points per interval, for the excess loss/attenuation plot and a spline interval size of about 0.68 kilometers, i.e., 85 signal points per interval, for the MFD variance plot. The further improvement in the interpretability of the plots is evident from a comparison of these figures. Also, a significant reduction in the number of values needed to be stored to characterize the fiber is achieved, e.g., a reduction on the order of 65 fold between the number of values needed to be stored to generate FIG. 5 and the number needed for FIG. 6. It should be noted that a point slope value for any part of the OTDR trace can be readily obtained from the spline-fitted excess loss/ attenuation plot (top panel of FIG. 6) by evaluating the first derivative of the spline representation and adding the average slope value for the fiber as determined during the original processing of the backscatter traces. Backscatter plots can be obtained from the spline-fitted excess loss/attenuation plot (top panel of FIG. 6) and the spline-fitted MFD variance plot (bottom panel of FIG. 6) by appropriate addition and subtraction of these plots.

Although preferred and other embodiments of the invention have been described herein, other embodiments may be perceived by those skilled in the art without departing from the scope of the invention as defined by the following claims.

What is claimed is:

1. A method for reducing the noise in an electrical signal, said signal having a finite length, comprising:
   (a) providing a function defined over the length of the signal which characterizes the signal's local noise;
   (b) locally evaluating said function;
   (c) locally determining the signal's noise based on the result of step (b);
   (d) locally subtracting the noise determined in step (c) from the signal; and
   (e) repeating steps (b) through (d) over the length of the signal so as to produce a noise-reduced signal.

2. The method of claim 1 wherein a continuous curve is fit to the noise-reduced signal.

3. The method of claim 2 wherein the continuous curve is a cubic spline.

4. The method of claim 1 wherein the electrical signal includes a carrier signal and the carrier signal is removed from the signal prior to step (a).

5. The method of claim 4 wherein step (a) is performed by fitting a cubic spline to the signal.

6. The method of claim 5 wherein the function is the signal's local signal to noise ratio.

7. The method of claim 6 wherein step (c) is performed by multiplying a set of local values of the signal with a matrix, said matrix being a function of the signal to noise ratio and the covariance matrix of an autocorrelated Gaussian process.

8. The method of claim 7 wherein the electrical signal is produced by an optical time domain reflectometer.

* * * * *